(12) United States Patent
Umatt et al.

(10) Patent No.: US 9,578,554 B2
(45) Date of Patent: Feb. 21, 2017

(54) METHODS AND APPARATUS FOR IMPROVING A CALL FALLBACK USER EXPERIENCE

(75) Inventors: Bhupesh Manoharlal Umatt, Poway, CA (US); Krishna Rao Mandadapu, San Diego, CA (US); Srinivasa Prasad Vangaru, San Diego, CA (US); Sathish Krishnamoorthy, Hyderabad (IN); Supratik Bhattacharjee, San Diego, CA (US); Joe Thomas, San Diego, CA (US); Thomas Klingenbrunn, San Diego, CA (US); Shyamal Ramachandran, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 423 days.

(21) Appl. No.: 13/620,135

(22) Filed: Sep. 14, 2012

(65) Prior Publication Data
US 2013/0070728 A1 Mar. 21, 2013

Related U.S. Application Data

(60) Provisional application No. 61/537,499, filed on Sep. 21, 2011.

(51) Int. Cl.
*H04W 4/00* (2009.01)
*H04W 36/00* (2009.01)

(52) U.S. Cl.
CPC ................ *H04W 36/0022* (2013.01)

(58) Field of Classification Search
USPC ................ 370/328, 329, 331, 352
See application file for complete search history.

(56) References Cited

U.S. PATENT DOCUMENTS

2003/0134662 A1* 7/2003 Shah et al. .............. 455/560
2010/0151863 A1* 6/2010 Kubo ...................... 455/436
(Continued)

FOREIGN PATENT DOCUMENTS

| CN | 102067709 A | 5/2011 |
| JP | 2004112097 A | 4/2004 |

(Continued)

OTHER PUBLICATIONS

International Search Report and Written Opinion—PCT/US2012/055804—ISA/EPO—Jan. 31, 2013.

*Primary Examiner* — Kwang B Yao
*Assistant Examiner* — Nguyen Ngo
(74) *Attorney, Agent, or Firm* — Patterson & Sheridan, L.L.P.

(57) ABSTRACT

Certain aspects of the present disclosure relate to techniques for improving a circuit-switched fallback (CSFB) user experience. In aspects, methods and systems for autonomously returning a user equipment (UE) from a 2G ($2^{nd}$ generation)/3G ($3^{rd}$ generation) network to an LTE (Long Term Evolution) network are provided. The UE may store a flag to note whether a current circuit switched (CS) call in the 2G/3G network is a result of a CSFB. The UE, in response to detecting a termination of the current CS call in the 2G/3G network and determining that the terminated call was a CSFB call (e.g., from the status of the flag), may trigger a mobility mechanism to autonomously return the UE to the LTE network.

52 Claims, 6 Drawing Sheets

(56) References Cited

U.S. PATENT DOCUMENTS

| | | |
|---|---|---|
| 2010/0278142 A1 | 11/2010 | Dwyer et al. |
| 2010/0317347 A1 | 12/2010 | Burbidge et al. |
| 2011/0014919 A1 | 1/2011 | Otte et al. |
| 2011/0092198 A1 | 4/2011 | Miyata |
| 2011/0149908 A1 | 6/2011 | Olsson et al. |
| 2011/0182269 A1* | 7/2011 | Yamagishi .......... H04W 76/028 370/331 |
| 2011/0222509 A1* | 9/2011 | Lee ............................... 370/331 |
| 2011/0268109 A1 | 11/2011 | Miyata |
| 2012/0120789 A1* | 5/2012 | Ramachandran et al. .... 370/220 |
| 2012/0184276 A1* | 7/2012 | Pichna et al. ................. 455/436 |
| 2012/0302234 A1* | 11/2012 | Wallis et al. ................. 455/433 |
| 2012/0322515 A1* | 12/2012 | Hwang et al. ................. 455/574 |
| 2013/0010696 A1* | 1/2013 | Mildh ........................... 370/328 |
| 2013/0287002 A1* | 10/2013 | Kim et al. .................... 370/331 |
| 2014/0146792 A1* | 5/2014 | Andre-Jonsson . H04W 36/0022 370/331 |
| 2014/0177596 A1* | 6/2014 | Watfa et al. .................. 370/331 |
| 2014/0192772 A1* | 7/2014 | Somasundaram et al. ... 370/331 |
| 2014/0269587 A1* | 9/2014 | Aghili et al. ................. 370/329 |

FOREIGN PATENT DOCUMENTS

| | | |
|---|---|---|
| JP | 2010147576 A | 7/2010 |
| JP | 2011091587 A | 5/2011 |

\* cited by examiner

METHODS AND APPARATUS FOR IMPROVING A CALL FALLBACK USER EXPERIENCE

CLAIM OF PRIORITY UNDER 35 U.S.C. §119

This application claims priority to U.S. Provisional Application Ser. No. 61/537,499, filed on Sep. 21, 2011, which is expressly incorporated by reference herein in its entirety.

BACKGROUND

Field

Aspects of the present disclosure relate generally to wireless communications, and more particularly, to methods and apparatus for improving a call fallback (e.g. circuit-switched fallback (CSFB)) user experience.

Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include code division multiple access (CDMA) networks, time division multiple access (TDMA) networks, frequency division multiple access (FDMA) networks, orthogonal FDMA (OFDMA) networks, and single-carrier FDMA (SC-FDMA) networks.

A user equipment (UE) may be located within the coverage of multiple wireless networks, which may support different communication services. A suitable wireless network may be selected to serve the UE based on one or more criteria. The selected wireless network may be unable to provide a desired communication service (e.g. voice service) for the UE. A set of procedures may then be performed to redirect the UE to another wireless network that can provide the desired communication service.

SUMMARY

Certain aspects of the present disclosure provide a method for wireless communications. The method generally includes receiving at a UE an indication that a call in a first radio access network (RAN) has ended; determining that the UE left service in a second RAN to establish the call in the first RAN; and in response to the determination, taking one or more actions by the UE to autonomously return to the second RAN.

Certain aspects of the present disclosure provide an apparatus for wireless communications. The apparatus generally includes means for receiving at a UE an indication that a call in a first radio access network (RAN) has ended; means for determining that the UE left service in a second RAN to establish the call in the first RAN; and means for taking one or more actions by the UE to autonomously return to the second RAN, in response to the determination.

Certain aspects of the present disclosure provide an apparatus for wireless communications. The apparatus generally includes at least one processor and a memory coupled to the at least one processor. The at least one processor is generally configured to receive at a UE an indication that a call in a first radio access network (RAN) has ended; determine that the UE left service in a second RAN to establish the call in the first RAN; and in response to the determination, take one or more actions by the UE to autonomously return to the second RAN.

Certain aspects of the present disclosure provide a computer-program product for wireless communications. The computer-program product generally includes a computer-readable medium comprising code. The code generally includes code for receiving at a UE an indication that a call in a first radio access network (RAN) has ended; determining that the UE left service in a second RAN to establish the call in the first RAN; and in response to the determination, taking one or more actions by the UE to autonomously return to the second RAN.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
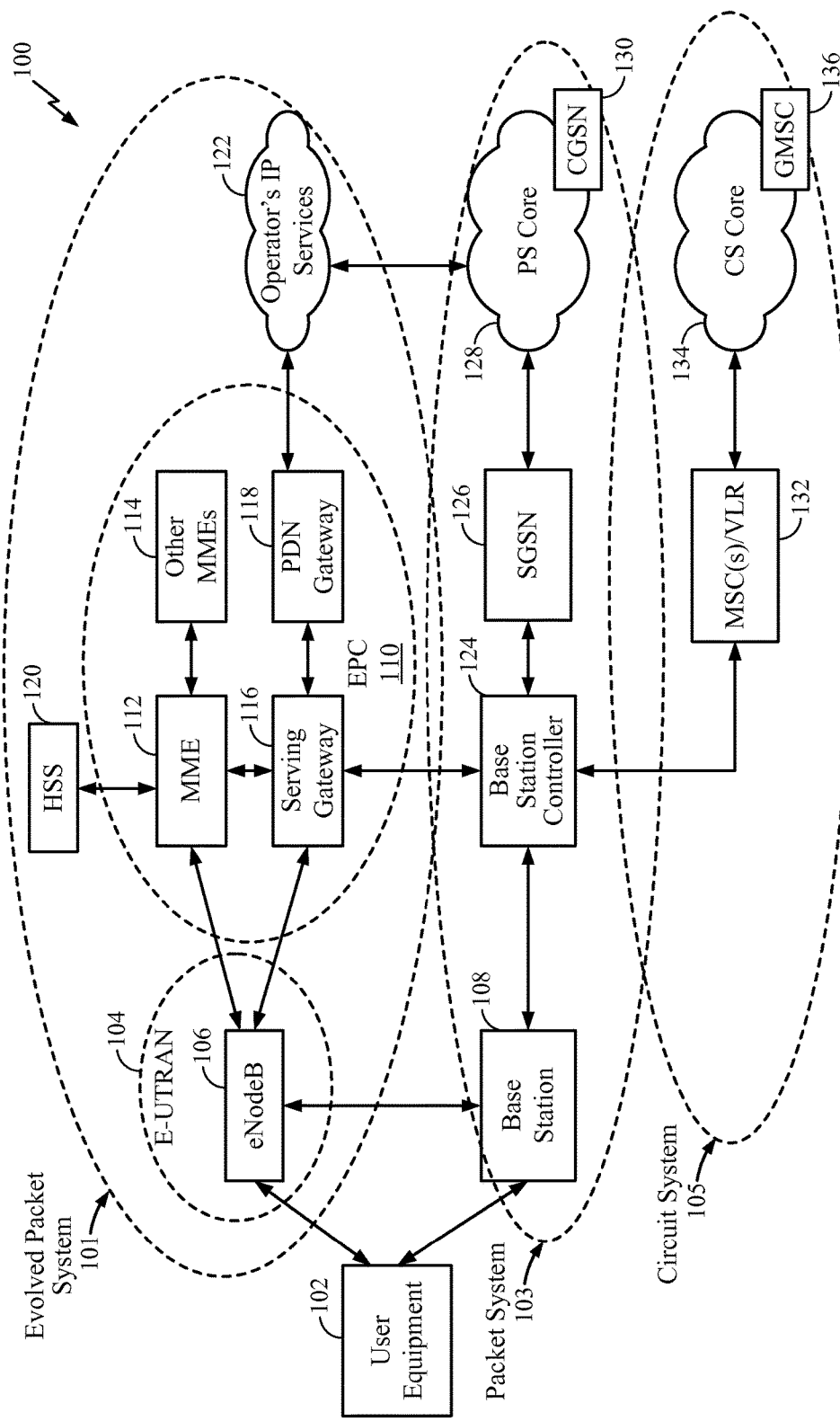
FIG. 1 shows a diagram illustrating a wireless communication network, in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented utilizing electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g. hard disk, floppy disk, magnetic strip), an optical disk (e.g. compact disk (CD), digital versatile disk (DVD)), a smart card, a flash memory device (e.g. card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below.

FIG. 1 shows a diagram illustrating a wireless network architecture 100 employing various apparatuses, in accordance with aspects of the disclosure. The network architecture 100 may include an Evolved Packet System (EPS) 101. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS may interconnect with other access networks, such as a packet switched core (PS core) 128, a circuit switched core (CS core) 134, etc. As shown, the EPS provides packet-switched services, however, as those skilled in the art will readily appreciate, the various concepts presented throughout this disclosure may be extended to networks providing circuit-switched services, such as the network associated with CS core 134.

The network architecture 100 may further include a packet switched network 103 and/or a circuit switched network 105. In one aspect, the packet switched network 103 may include base station 108, base station controller 124, Serving GPRS Support Node (SGSN) 126, PS core 128 and Combined GPRS Service Node (CGSN) 130. In another aspect, the circuit switched network 105 may include base station 108, base station controller 124, Mobile services Switching Centre (MSC), Visitor location register (VLR) 132, CS core 134 and Gateway Mobile Switching Centre (GMSC) 136.

The E-UTRAN may include an evolved Node B (eNB) 106 and connection to other networks, such as packet and circuit switched networks may be facilitated through base station 108. The eNB 106 provides user and control plane protocol terminations toward the UE 102. The eNB 106 may be connected to the other eNBs 108 via an X2 interface (e.g. backhaul). The eNB 106 may also be referred to by those skilled in the art as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g. MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 include the Internet, the Intranet, an IP Multimedia Subsystem (IMS), and a PS Streaming Service (PSS).

In an aspect of the disclosure, the wireless system 100 may be enabled to facilitate circuit switched fallback (CSFB). In an aspect, when a phone number is dialed to place a CS call, if the UE were camped on an LTE network, a CSFB procedure may be employed. The CSFB procedure may move the UE from an LTE cell to a CS based cell, such as UTRAN, GERAN, etc., where the CS call setup may occur using legacy CS call setup procedures. The term "cell" can refer to a coverage area of an eNB or base station and/or an eNB or base station subsystem serving this coverage area. As used herein, CSFB may refer to establishing a signaling channel between a circuit switched MSC 132 and the LTE core network 101 to allow for services, such as voice calls, short message service (SMS), etc. In an implementation, when a UE 102 is moved from an LTE network 101 to a 3GPP network, such as a CS based network 103 (UTRAN), a packet switched (PS) network 103, etc., the UE may perform one or more registration procedures prior to being able to communicate user data over the 3GPP network.

In an aspect of the disclosure, although the description may provide examples through use of a UTRAN system, it should be appreciated that other RATs, such as GERAN, etc., may be used.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

In an aspect, upon power up, UE 102 may search for wireless networks from which it can receive communication services. If more than one wireless network is detected, then a wireless network with the highest priority may be selected to serve UE 102 and may be referred to as the serving network. UE 102 may perform registration with the serving network, if necessary. UE 102 may then operate in a connected mode to actively communicate with the serving network. Alternatively, UE 102 may operate in an idle mode and camp on the serving network if active communication is not required by UE 102.

UE 102 may be located within the coverage of cells of multiple frequencies and/or multiple RATs while in the idle mode. For LTE, UE 102 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 102 may be configured to prefer LTE, when available, by defining the priority list with LTE frequencies at the highest priority and with frequencies for other RATs at lower priorities, e.g. as given by the example above.

UE 102 may operate in the idle mode as follows. UE 102 may identify all frequencies/RATs on which it is able to find a "suitable" cell in a normal scenario or an "acceptable" cell in an emergency scenario, where "suitable" and "acceptable" are specified in the LTE standards. UE 102 may then camp on the frequency/RAT with the highest priority among all identified frequencies/RATs. UE 102 may remain camped on this frequency/RAT until either (i) the frequency/RAT is no longer available at a predetermined threshold or (ii) another frequency/RAT with a higher priority reaches this threshold. This operating behavior for UE 102 in the idle mode is described in 3GPP TS 36.304, entitled "Evolved Universal Terrestrial Radio Access (E-UTRA); User Equipment (UE) procedures in idle mode," which is publicly available.

Figure 2:
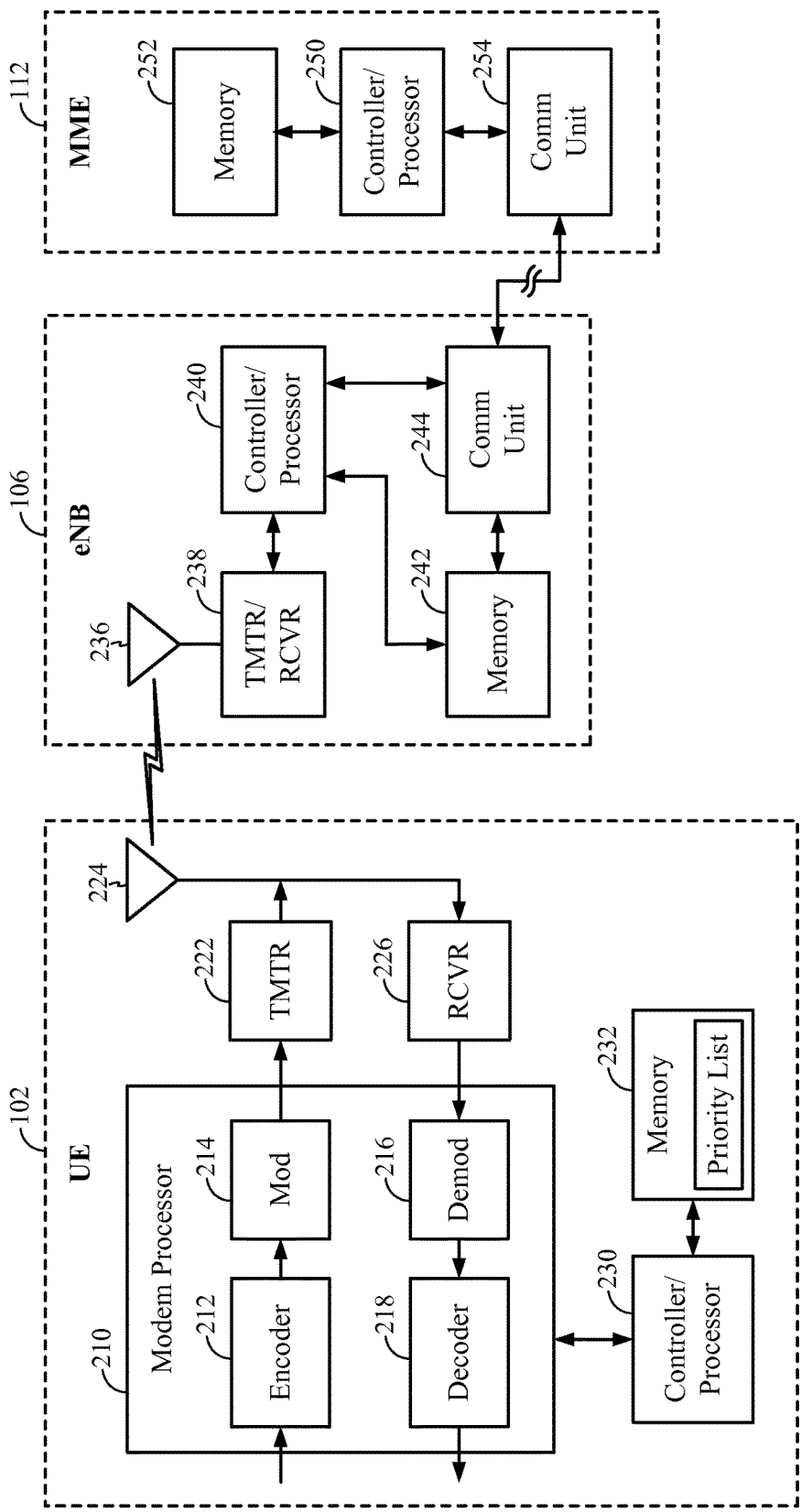
FIG. 2 illustrates a block diagram of a user equipment (UE) and other network entities.

FIG. 2 shows a block diagram of a design of UE 102, eNB 106, and MME 112 in FIG. 1. At UE 102, an encoder 212 may receive traffic data and signaling messages to be sent on the uplink. Encoder 212 may process (e.g. format, encode, and interleave) the traffic data and signaling messages. A modulator (Mod) 214 may further process (e.g. symbol map and modulate) the encoded traffic data and signaling messages and provide output samples. A transmitter (TMTR) 222 may condition (e.g. convert to analog, filter, amplify, and frequency upconvert) the output samples and generate an uplink signal, which may be transmitted via an antenna 224 to eNB 106.

On the downlink, antenna 224 may receive downlink signals transmitted by eNB 106 and/or other eNBs/base stations. A receiver (RCVR) 226 may condition (e.g. filter, amplify, frequency down-convert, and digitize) the received signal from antenna 224 and provide input samples. A demodulator (Demod) 216 may process (e.g. demodulate) the input samples and provide symbol estimates. A decoder 218 may process (e.g. de-interleave and decode) the symbol estimates and provide decoded data and signaling messages sent to UE 102. Encoder 212, modulator 214, demodulator 216, and decoder 218 may be implemented by a modem processor 210. These units may perform processing in accordance with the RAT (e.g. LTE, 1xRTT, etc.) used by the wireless network with which UE 102 is in communication.

A controller/processor 230 may direct the operation at UE 102. Controller/processor 230 may also perform or direct other processes for the techniques described herein. Controller/processor 230 may also perform or direct the processing by UE 102 in FIGS. 3 and 4. Memory 232 may store program codes and data for UE 102. Memory 232 may also store a priority list and configuration information.

At eNB 106, a transmitter/receiver 238 may support radio communication with UE 102 and other UEs. A controller/processor 240 may perform various functions for communication with the UEs. On the uplink, the uplink signal from UE 102 may be received via an antenna 236, conditioned by receiver 238, and further processed by controller/processor 240 to recover the traffic data and signaling messages sent by UE 102. On the downlink, traffic data and signaling messages may be processed by controller/processor 240 and conditioned by transmitter 238 to generate a downlink signal, which may be transmitted via antenna 236 to UE 102 and other UEs. Controller/processor 240 may also perform or direct other processes for the techniques described herein. Controller/processor 240 may also perform or direct the processing by eNB 106 in FIGS. 3 and 4. Memory 242 may store program codes and data for the base station. A communication (Comm) unit 244 may support communication with MME 112 and/or other network entities.

At MME 112, a controller/processor 250 may perform various functions to support communication services for UEs. Controller/processor 250 may also perform or direct the processing by MME 112 in FIGS. 3 and 4. Memory 252 may store program codes and data for MME 112. A communication unit 254 may support communication with other network entities.

FIG. 2 shows simplified designs of UE 102, eNB 106, and MME 112. In general, each entity may include any number of transmitters, receivers, processors, controllers, memories, communication units, etc. Other network entities may also be implemented in similar manner.

Figure 3:
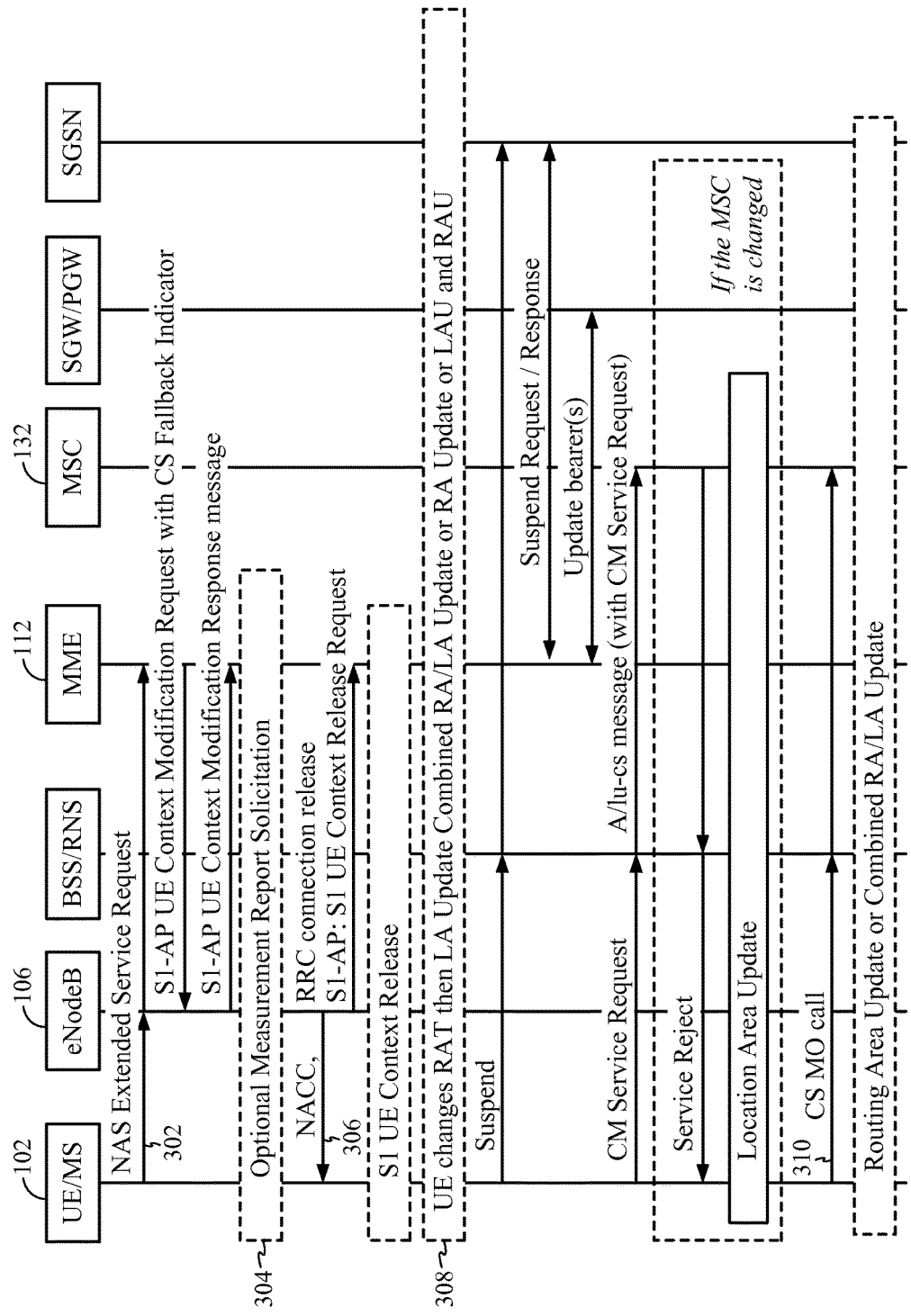
FIG. 3 illustrates an example call flow of circuit-switched fallback (CSFB) when a UE makes a mobile originating (MO) call, according to certain aspects of the present disclosure.

FIG. 3 illustrates an example call flow of CSFB when a UE 102 makes a mobile originating (MO) call, according to certain aspects of the present disclosure. While the UE 102 is camped on an LTE network (eNB 106) that may not support voice services, the UE 102 may need to fallback to a GSM/UMTS network connected to the MSC 132 in order to make the MO call. The call setup procedure may begin at 302 where the UE 102 may send a non access stratum (NAS) extended service request (ESR) to the MME 112. The ESR may comprise a CSFB indicator that informs the MME 112 to perform CSFB. In response to the ESR, the MME 112 may indicate to the eNB 106 that the UE 102 should be moved to a GSM/UMTS network.

At 304, the eNB 106 may receive a measurement report from the UE 102 to determine CS RAT candidates to which the redirection procedure may be performed. At 306, the LTE network may assist the UE 102 in the mobility procedure (e.g. reselection, redirection, handover, or network assisted cell change (NACC)). For example, if an interface between the MSC 132 and the MME 112 is down, the LTE network may inform the UE 102 to retry the call setup after a set period of time. For some embodiments, the eNB 106 may trigger an inter-RAT cell change order with the NACC to a GSM cell by sending an RRC message to the UE 102. The inter-RAT cell change order may contain a CSFB indicator that indicates to the UE 102 that the cell change order is triggered due to a CSFB request.

At 308, the UE 102 may move to the new GSM cell, using, for example, the NACC information and establishing the radio signaling connection. At 310, the UE may initiate the CS MO call.

Figure 4:
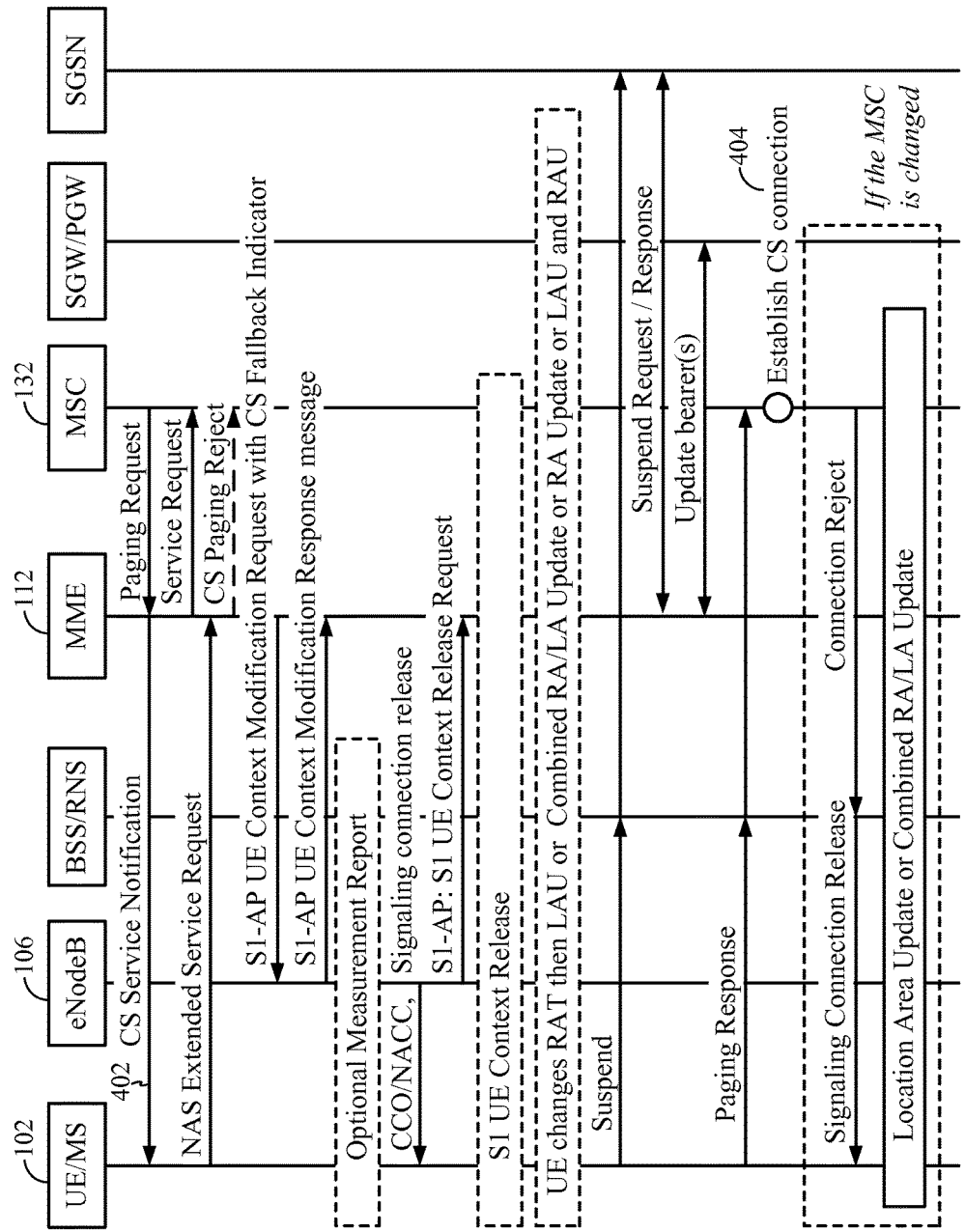
FIG. 4 illustrates an example call flow of CSFB when a UE receives a mobile terminating (MT) call, according to certain aspects of the present disclosure.

FIG. 4 illustrates an example call flow of CSFB when a UE 102 receives a mobile terminating (MT) call, according to certain aspects of the present disclosure. Operations may be similar to those described in FIG. 3, however, the UE 102 may initiate the call setup procedure after receiving a GSM/UMTS page at 402 (e.g. CS SERVICE NOTIFICATION). For example, the MSC 132 may receive an incoming voice call and respond by sending a paging request to the MME 112. The eNB 106 may forward the paging message to the UE 102. At 404, if the UE 102 is registered in the MSC 132 serving a GSM/UMTS cell, the MSC 132 may establish the CS MT call.

System and Method of Improving Circuit-Switched Fallback User Experience

In certain aspects, certain current LTE or 4G (Fourth Generation) networks are pure IP networks without support for voice solutions for UEs camped on the LTE network. There is an interest in the industry to facilitate voice services on devices that are LTE and 2G/3G capable and spend most of their time on LTE networks. CSFB (Circuit Switched Fall Back) allows such multi radio access technology (RAT) capable UEs to make voice calls while camped on an LTE network. For certain aspects, when CSFB is supported, a UE that is camped on an LTE network and that wants to make a voice call not supported by the LTE network, is transferred to a 2G/3G network for servicing the voice call.

In certain aspects, when the UE camped on the LTE network determines that it needs to make a voice call, it sends an extended service request to the LTE network. The extended service request informs the LTE network that the UE wants to make a voice call. Once the LTE network receives the extended service request, it may implement a mobility procedure including e.g. reselection, redirection, handover etc. to move the UE to a 2G/3G network. The LTE network may store a context of the UE within the LTE network and not waste time or resources trying to reach the UE once it is transferred to the 2G/3G network for servicing the voice call.

In certain aspect, once the circuit switched (CS) call in the 2G/3G network ends and there is no more packet switched (PS) or data activity, the operator may prefer the UE to camp on LTE to take advantage of the higher data rates provided by the LTE network. In an aspect, the standards based mechanisms to push the UE back to the LTE network after the termination of a CSFB call typically include cell reselection, cell redirection and packet switched handover (PSHO).

In certain aspects cell reselection allows the UE to transfer from an IDLE mode in the 2G/3G network to an IDLE mode in the LTE network. Thus, for cell reselection, the UE must return to an IDLE mode on the 2G/3G network, select an LTE network, and then transfer to the selected LTE network. The operator may tweak the cell reselection priorities (e.g. in the UE's neighbor cell list) in a manner so that the UE is encouraged to transfer from 2G/3G to LTE at the earliest possible. But, for the reselection mechanism to work the UE must be in an IDLE mode. Thus, if the UE is involved in packet data activity when the CS call ends, the network may not tear down the data connection and bring the UE back to an IDLE mode, and the reselection procedure may not be used.

In certain aspects, for cases when the UE has PS activity at the end of a CS call, cell redirection procedure may be used to transfer the UE to LTE. A network entity in the 2G/3G network may send a redirection message to the UE instructing the UE to transition to a certain channel on an LTE network and resume its data activity in the LTE network. The cell redirection mechanism allows the UE to transfer from a connected mode in the 2G/3G network to an IDLE mode in the LTE network.

In certain aspects, the PSHO mechanism includes the 2G/3G network reserving resources on the LTE network for the UE and then pushing the UE over to the LTE network in connected mode using the reserved resources. Thus, the UE may see a least amount of glitch to any data activity that might have been going on at the time of the transfer. Thus, the PSHO method allows the UE to transfer from a connected mode in the 2G/3G network to a connected mode in the LTE network.

In certain aspects, although standards based inter radio access technology (RAT) mobility mechanisms exist for the UE to return to LTE after CSFB to e.g. UTRAN/GERAN, it is possible that the standards based mechanisms alone are not sufficient for the following reasons:

a) They are not supported. For example, some operators do not support reselection/redirection/PSHO from 2G/3G to LTE.

b) They are not desirable. Reselection thresholds and hysteresis times may be set in a conservative manner so as to delay reselections. The operator may want to apply different rules for CSFB than for data cards.

c) They never kick in. User data activity may prevent the UE from reselecting from 2G/3G to 4G LTE.

In certain aspects, certain network operators may not support cell redirection and PSHO and may only implement the cell reselection procedure for transferring the UE back to LTE. But, as noted above, if the UE has continuing PS activity or switches frequently between connected and IDLE states in the 2G/3G network, the reselection procedure may not work and the UE may not be able to return back to LTE.

Thus, there may be cases when these three mobility mechanisms may not be suitable for one or more reasons and the UE may be required to determine that the CS call has ended and move to LTE autonomously at the earliest possible.

In certain aspects, the UE makes a note of the fact that a current call in the 2G/3G network is a result of a CSFB. The UE may remember this by maintaining a flag (e.g. storing a CSFB indicator bit). For example, the UE may set the flag to one if the call is a CSFB call and may reset the flag to zero if the call is not a CSFB call. The UE may detect the end of a CS call by detecting a network release of a CS Radio Access Bearer (RAB). This may include the UE detecting a Radio Bearer release message from the network.

In certain aspects, once the UE detects the network release of the CS RAB, it checks (e.g. the flag) to determine if the call just released was a CSFB call. The detection of the CS RAB release along with the determination that the released call was a CSFB call may trigger a mobility mechanism to return the UE to LTE. The mobility mechanism may start with the UE sending a Signaling Connection Release Indication (SCRI) message for the PS domain. The SCRI is typically triggered from the application layer of the UE indicating that the UE has no ongoing PS data activity and requesting the network to release a current signaling connection. Once the UE sends the SCRI message, the mobility mechanism may take multiple paths.

In a first aspect, the UE may leave the 3G network right after sending the SCRI message, without waiting to know if the network has released the connection.

In a second aspect, the UE may wait to receive an acknowledgement ACK from a lower (L2) layer to ensure that the SCRI message was successfully received by the network. The UE may leave the network for LTE service once it receives the ACK.

In a third aspect, the UE may wait for an indication that the network has released the connection, before leaving the network for LTE service. This may include the UE waiting to receive a network connection release message (e.g. an RRC connection release) from the network.

In a fourth aspect, the UE may only wait for a certain period of time for the ACK and/or connection release to arrive, before leaving the network for LTE service. For example, the UE may start a configurable timer when it sends the SCRI message, and leave the network if it does not receive the ACK and/or connection release before the timer expires.

In certain aspects, once the UE decides to leave the 2G/3G network for LTE service, it may start a cell selection procedure to look for the LTE service. In an aspect, the UE stores information that enables the UE to maximize a probability to find LTE service. For example, the UE may store information about the LTE channel it used before the CSFB call was made, and may start cell selection by looking for the availability of the same LTE channel. In some embodiments, the UE may store a neighbor list (e.g. received from the 2G/3G network). The cell selection procedure may be based on such neighbor list.

In certain aspects, the above discussed mobility procedure may be implemented only when the UE is in certain PLMNs (Public Land Mobile Networks) that support the mobility procedure. The UE may maintain a list of PLMNs and the mobility procedure may be executed only if the serving PLMN is in the UEs list.

Figure 5:
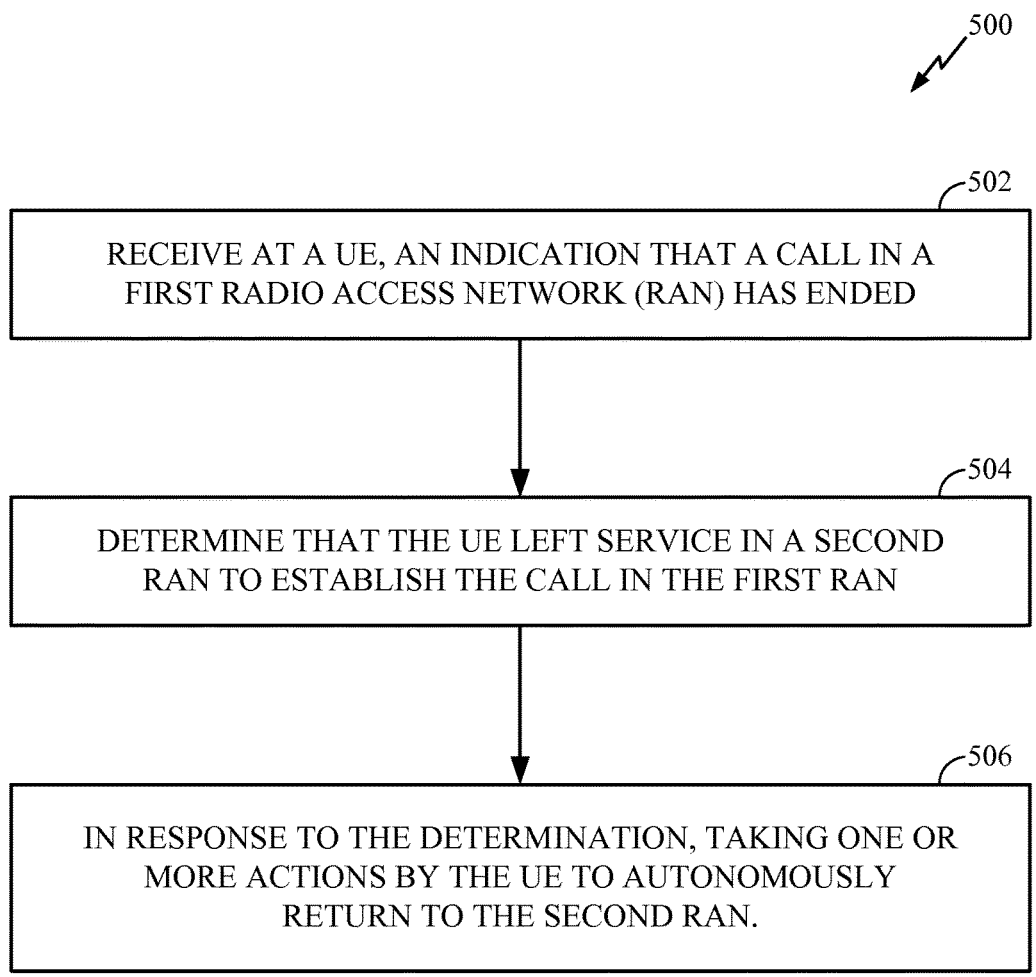
FIG. 5 illustrates example operations for autonomously connecting a UE from a 2G/3G network back to an LTE network upon termination of a CSFB call in the 2G/3G network, in accordance with certain aspects of the present disclosure.

FIG. 5 illustrates example operations 500 for autonomously connecting a UE from a 2G/3G network back to an LTE network upon termination of a CSFB call in the 2G/3G network, in accordance with certain aspects of the present disclosure.

Operations 500, start at 502, by receiving at a UE an indication that a call in a first radio access network (RAN) has ended. At 504, it is determined that the UE left service in a second RAN to establish the call in the first RAN. At 506, in response to the determination, the UE takes one or more actions to autonomously return to the second RAN.

Figure 6:
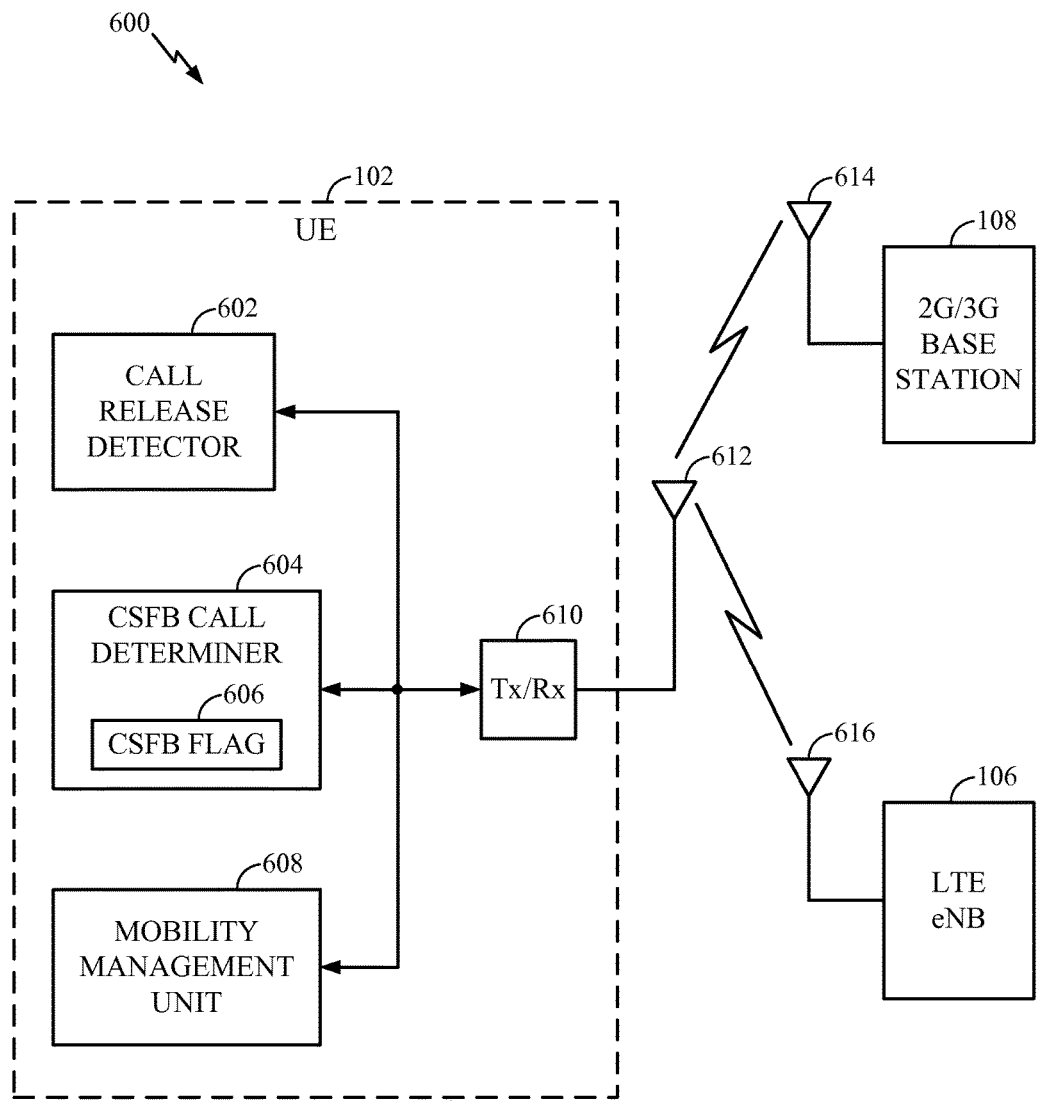
FIG. 6 illustrates an example system for autonomously connecting a UE from a 2G/3G network back to an LTE network upon termination of a CSFB call in the 2G/3G network, in accordance with certain aspects of the present disclosure.

FIG. 6 illustrates an example system 600 for autonomously connecting a UE from a 2G/3G network back to an LTE network upon termination of a CSFB call in the 2G/3G network, in accordance with certain aspects of the present disclosure.

System 600 may include an LTE eNB 106, a 2G/3G Base Station (BS) 108 and a UE 102 capable of communicating with both the LTE eNB 106 and the 2G/3G BS 108. The eNB 106 may provide service for an LTE RAN and the BS 108 may provide service for a 2G/3G RAN. The UE 102 may be positioned in an overlapping service area of both the LTE and 2G/3G RANs.

The UE 102 may include a transceiver 610, a call release detector 602, a CSFB call determiner 604 and a mobility management unit 608. In certain aspects, the transceiver 610 may receive a radio bearer release message from the BS 108 and the call release detector 602 may detect a termination of a CS call by detecting release of a CS RAB by the 2G/3G network from the received message.

Once the UE 102 detects the network release of the CS RAB, the CSFB call determiner 604 may determine whether the call just released was a CSFB call by checking a status of a CSFB FLAG 606. For example, if the CSFB FLAG is set to one, the CSFB call determiner 604 may determine that the call was a CSFB call. On the other hand, if the CSFB FLAG is reset to zero, the CSFB call determiner 604 may determine that the call was not a CSFB call.

The mobility management unit 608 may implement one or more UE mobility mechanisms to return the UE 102 back to an LTE RAN, in response to the release of the CS call and whether the released call was a CSFB call or not. For example, the mobility management unit 608 may trigger a mobility mechanism when a CS call release is detected by the call release detector 602 and if the CSFB call determiner 604 determines that the released CS call was a CSFB call. As discussed above, the mobility mechanism may include the UE 102 sending a SCRI message to the BS 108 requesting the 2G/3G network to release a current signaling connection. The mobility mechanism may further include a cell selection procedure to look for LTE service. The UE may establish a connection with eNB 106 as a result of the cell selection procedure.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which may be a wired terminal or a wireless terminal. A terminal may also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g. mobile-to-mobile) ad hoc network systems often using unpaired unlicensed spectrums, 802.xx wireless LAN, BLUETOOTH and any other short- or long-range, wireless communication techniques.

It should be understood and appreciated that various aspects or features will be presented in terms of systems that may include a number of devices, components, modules, and the like. It should also be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor may read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for wireless communications, comprising:
   receiving at a user equipment (UE), an indication that a call in a first radio access network (RAN) has ended;
   detecting that a PLMN (Public Land Mobile Network) serving the UE is included in a list of PLMNs maintained by the UE;
   in response to the detecting:
      determining that the UE left service in a second RAN to establish the call in the first RAN; and
      in response to the receiving and the determination, taking one or more actions by the UE to autonomously return to the second RAN, wherein a combination of detecting that the call in the first RAN has ended and that the UE left service in the second RAN to establish the call in the first RAN triggers the one or more actions by the UE,
      wherein taking the one or more actions comprises sending a request to the first RAN to release a connection with the UE.

2. The method of claim 1, wherein taking the one or more actions further comprises:
   performing a cell selection procedure to select a cell of the second RAN; and
   connecting by the UE to the selected cell of the second RAN.

3. The method of claim 2, wherein taking the one or more actions further comprises:
   receiving an acknowledgement of the request from the first RAN; and
   wherein performing the cell selection procedure includes performing the cell selection procedure in response to receiving the acknowledgement of the request from the first RAN.

4. The method of claim 2, wherein taking the one or more actions further comprises:
   receiving an indication from the first RAN that the connection with the UE has been released; and
   wherein performing the cell selection procedure includes performing the cell selection procedure in response to receiving the indication from the first RAN that the connection with the UE has been released.

5. The method of claim 2, wherein taking the one or more actions further comprises:
   determining a configurable timer has expired; and
   wherein performing the cell selection procedure includes performing the cell selection procedure in response to expiration of the configurable timer.

6. The method of claim 5 wherein the configurable timer is started when the request is sent to the first RAN to release a connection with the UE.

7. The method of claim 2, wherein the request to the first RAN to release the connection with the UE includes a Signaling Connection Release Indication (SCRI) message.

8. The method of claim 1, wherein the first RAN comprises at least one of a second generation (2G) RAN or a third generation (3G) RAN.

9. The method of claim 1, wherein the second RAN comprises a Long-Term Evolution RAN.

10. The method of claim 1, wherein taking the one or more actions comprises:
    performing a cell selection procedure to select a cell that supports the second RAN; and
    connecting by the UE to the selected cell of the second RAN.

11. The method of claim 1, wherein determining that the UE left service in the second RAN to take the call in the first RAN includes determining that a circuit switched fall back indicator bit is set on the UE.

12. The method of claim 1, wherein the indication that the call in the first radio access network (RAN) has ended includes a radio bearer release message.

13. The method of claim 1, wherein the call is a circuit switched call.

14. An apparatus for wireless communications, comprising:
    means for receiving at a UE an indication that a call in a first radio access network (RAN) has ended;
    means for detecting that a PLMN (Public Land Mobile Network) serving the UE is included in a list of PLMNs maintained by the UE; and
    means for, in response to the detecting,
       determining that the UE left service in a second RAN to establish the call in the first RAN, and
       taking one or more actions by the UE to autonomously return to the second RAN, in response to the receiving and the determination, wherein a combination of detecting that the call in the first RAN has ended and that the UE left service in the second RAN to establish the call in the first RAN triggers the one or more actions by the UE,
       wherein taking the one or more actions comprises sending a request to the first RAN to release a connection with the UE.

15. The apparatus of claim 14, wherein the means for taking the one or more actions further comprise:
    means for performing a cell selection procedure to select a cell of the second RAN; and
    means for connecting by the UE to the selected cell of the second RAN.

16. The apparatus of claim 15, wherein the means for taking the one or more actions further comprise:

means for receiving an acknowledgement of the request from the first RAN; and wherein the means for performing the cell selection procedure includes means for performing the cell selection procedure in response to receiving the acknowledgement of the request from the first RAN.

17. The apparatus of claim 15, wherein the means for taking the one or more actions further comprise:

means for receiving an indication from the first RAN that the connection with the UE has been released; and wherein the means for performing the cell selection procedure includes means for performing the cell selection procedure in response to receiving the indication from the first RAN that the connection with the UE has been released.

18. The apparatus of claim 15, wherein the means for taking the one or more actions further comprise:

means for determining a configurable timer has expired; and wherein the means for performing the cell selection procedure includes means for performing the cell selection procedure in response to expiration of the configurable timer.

19. The apparatus of claim 18 wherein the configurable timer is started when the request is sent to the first RAN to release a connection with the UE.

20. The apparatus of claim 15, wherein the request to the first RAN to release the connection with the UE includes a Signaling Connection Release Indication (SCRI) message.

21. The apparatus of claim 14, wherein the first RAN comprises at least one of a second generation (2G) RAN or a third generation (3G) RAN.

22. The apparatus of claim 14, wherein the second RAN comprises a Long-Term Evolution RAN.

23. The apparatus of claim 14, wherein the means for taking the one or more actions comprise:

means for performing a cell selection procedure to select a cell that supports the second RAN; and means for connecting by the UE to the selected cell of the second RAN.

24. The apparatus of claim 14, wherein the means for determining that the UE left service in the second RAN to establish the call in the first RAN includes means for determining that a circuit switched fall back indicator bit is set on the UE.

25. The apparatus of claim 14, wherein the indication that the call in the first radio access network (RAN) has ended includes a radio bearer release message.

26. The apparatus of claim 14, wherein the call is a circuit switched call.

27. A apparatus for wireless communications, comprising:
at least one processor configured to:
receive at a UE an indication that a call in a first radio access network (RAN) has ended;
detect that a PLMN (Public Land Mobile Network) serving the UE is included in a list of PLMNs maintained by the UE;
wherein the at least one processor, based on the detection, is configured to:
determine that the UE left service in a second RAN to establish the call in the first RAN; and
in response to the receiving and the determination, take one or more actions by the UE to autonomously return to the second RAN, wherein a combination of detecting that the call in the first RAN has ended and that the UE left service in the second RAN to establish the call in the first RAN triggers the one or more actions by the UE,
wherein taking the one or more actions comprises sending a request to the first RAN to release a connection with the UE; and
a memory coupled to the at least one processor.

28. The apparatus of claim 27, wherein the at least one processor is configured to take the one or more actions by:
performing a cell selection procedure to select a cell of the second RAN; and
connecting by the UE to the selected cell of the second RAN.

29. The apparatus of claim 28, wherein the at least one processor is configured to take the one or more actions by:
receiving an acknowledgement of the request from the first RAN; and
wherein performing the cell selection procedure includes performing the cell selection procedure in response to receiving the acknowledgement of the request from the first RAN.

30. The apparatus of claim 28, wherein the at least one processor is configured to take the one or more actions by:
receiving an indication from the first RAN that the connection with the UE has been released; and
wherein performing the cell selection procedure includes performing the cell selection procedure in response to receiving the indication from the first RAN that the connection with the UE has been released.

31. The apparatus of claim 28, wherein the at least one processor is configured to take the one or more actions by:
determining a configurable timer has expired; and
wherein performing the cell selection procedure includes performing the cell selection procedure in response to expiration of the configurable timer.

32. The apparatus of claim 31 wherein the configurable timer is started when the request is sent to the first RAN to release a connection with the UE.

33. The apparatus of claim 28, wherein the request to the first RAN to release the connection with the UE includes a Signaling Connection Release Indication (SCRI) message.

34. The apparatus of claim 27, wherein the first RAN comprises at least one of a second generation (2G) RAN or a third generation (3G) RAN.

35. The apparatus of claim 27, wherein the second RAN comprises a Long-Term Evolution RAN.

36. The apparatus of claim 27, wherein the at least one processor is configured to take the one or more actions by:
performing a cell selection procedure to select a cell that supports the second RAN; and
connecting by the UE to the selected cell of the second RAN.

37. The apparatus of claim 27, wherein the at least one processor is configured to determine that the UE left service in the second RAN to take the call in the first RAN by determining that a circuit switched fall back indicator bit is set on the UE.

38. The apparatus of claim 27, wherein the indication that the call in the first radio access network (RAN) has ended includes a radio bearer release message.

39. The apparatus of claim 27, wherein the call is a circuit switched call.

40. A computer-program product for wireless communications, comprising:
a non-transitory computer-readable medium comprising code for:
receiving at a UE an indication that a call in a first radio access network (RAN) has ended;

detecting that a PLMN (Public Land Mobile Network) serving the UE is included in a list of PLMNs maintained by the UE;
in response to the detecting:
determining that the UE left service in a second RAN to establish the call in the first RAN; and
in response to the receiving and the determination, taking one or more actions by the UE to autonomously return to the second RAN, wherein a combination of detecting that the call in the first RAN has ended and that the UE left service in the second RAN to establish the call in the first RAN triggers the one or more actions by the UE,
wherein taking the one or more actions comprises sending a request to the first RAN to release a connection with the UE.

41. The computer-program product of claim 40, wherein taking the one or more actions further comprise:
performing a cell selection procedure to select a cell of the second RAN; and
connecting by the UE to the selected cell of the second RAN.

42. The computer-program product of claim 41, wherein taking the one or more actions further comprise:
receiving an acknowledgement of the request from the first RAN; and
wherein performing the cell selection procedure includes performing the cell selection procedure in response to receiving the acknowledgement of the request from the first RAN.

43. The computer-program product of claim 41, wherein taking the one or more actions further comprise:
receiving an indication from the first RAN that the connection with the UE has been released; and
wherein performing the cell selection procedure includes performing the cell selection procedure in response to receiving the indication from the first RAN that the connection with the UE has been released.

44. The computer-program product of claim 41, wherein taking the one or more actions further comprise:
determining a configurable timer has expired; and
wherein performing the cell selection procedure includes performing the cell selection procedure in response to expiration of a configurable timer.

45. The computer-program product of claim 44 wherein the configurable timer is started when the request is sent to the first RAN to release a connection with the UE.

46. The computer-program product of claim 41, wherein the request to the first RAN to release the connection with the UE includes a Signaling Connection Release Indication (SCRI) message.

47. The computer-program product of claim 40, wherein the first RAN comprises at least one of a second generation (2G) RAN or a third generation (3G) RAN.

48. The computer-program product of claim 40, wherein the second RAN comprises a Long-Term Evolution RAN.

49. The computer-program product of claim 40, wherein taking the one or more actions comprise:
performing a cell selection procedure to select a cell that supports the second RAN; and
connecting by the UE to the selected cell of the second RAN.

50. The computer-program product of claim 40, wherein determining that the UE left service in the second RAN to establish the call in the first RAN includes determining that a circuit switched fall back indicator bit is set on the UE.

51. The computer-program product of claim 40, wherein the indication that the call in the first radio access network (RAN) has ended includes a radio bearer release message.

52. The computer-program product of claim 40, wherein the call is a circuit switched call.

* * * * *